US011892807B2

(12) United States Patent
Born et al.

(10) Patent No.: US 11,892,807 B2
(45) Date of Patent: Feb. 6, 2024

(54) MEASUREMENT OF THE PRECISION OF A TIMEPIECE COMPRISING A CONTINUOUS ROTATION ELECTROMECHANICAL TRANSDUCER IN THE ANALOGUE TIME DISPLAY DEVICE THEREOF

(71) Applicant: The Swatch Group Research and Development Ltd, Marin (CH)

(72) Inventors: Jean-Jacques Born, Morges (CH); Laurent Nagy, Liebefeld (CH)

(73) Assignee: The Swatch Group Research and Development Ltd, Marin (CH)

( * ) Notice: Subject to any disclaimer, the term of this patent is extended or adjusted under 35 U.S.C. 154(b) by 931 days.

(21) Appl. No.: 16/854,041

(22) Filed: Apr. 21, 2020

(65) Prior Publication Data

US 2020/0387114 A1 Dec. 10, 2020

(30) Foreign Application Priority Data

Jun. 6, 2019 (EP) .................................... 19178785

(51) Int. Cl.
*G04C 3/16* (2006.01)
*G04C 10/00* (2006.01)
*G04F 5/10* (2006.01)

(52) U.S. Cl.
CPC ............... *G04C 3/16* (2013.01); *G04C 10/00* (2013.01); *G04F 5/10* (2013.01)

(58) Field of Classification Search
CPC .......... G04C 3/16; G04C 3/165; G04C 10/00; G04F 5/10
See application file for complete search history.

(56) References Cited

U.S. PATENT DOCUMENTS 3,696,258 A * 10/1972 Anderson ................ G04C 3/16 55/DIG. 39
2005/0036405 A1* 2/2005 Born .................... G04B 17/063 368/127

(Continued)

FOREIGN PATENT DOCUMENTS

CH 713306 A2 * 6/2018 ............ G04B 17/20
CH 714041 A2 * 2/2019

(Continued)

OTHER PUBLICATIONS

"Analyzer Twin", Witschi Electronic Ltd, URL: https://www.witschi.com/assets/files/sheets/leaflet_analyzer-Twin.pdf, May 31, 2011, XP055636846.

(Continued)

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A method for measuring the medium frequency of a digital signal derived from a reference periodic signal generated by an electronic oscillator (quartz oscillator) forming a timepiece (2) which includes an analogue time display device and a continuous rotation electromechanical transducer (generator or continuous rotation motor) which is kinematically linked to this display device and wherein the medium rotational speed is regulated by a regulation device. The medium frequency of the digital signal is determined by a measurement device (70) without galvanic contact with the movement of the timepiece. The measurement method makes it possible to determine the rate of the timepiece and the precision of the electronic oscillator based on regulation impulses detected by a magnetic sensor (72) and over a measurement period limited to the duration of an inhibition cycle of periods of the reference periodic signal.

12 Claims, 7 Drawing Sheets

(56) References Cited

U.S. PATENT DOCUMENTS

| | | | | |
|---|---|---|---|---|
| 2005/0073913 | A1* | 4/2005 | Born | G04C 10/00 368/127 |
| 2019/0187624 | A1* | 6/2019 | Tombez | G04C 3/047 |
| 2020/0387114 | A1* | 12/2020 | Born | G04C 11/00 |

FOREIGN PATENT DOCUMENTS

| | | | |
|---|---|---|---|
| CN | 1176415 | A | 3/1998 |
| CN | 1187643 | A | 7/1998 |
| CN | 1204885 | A | 1/1999 |
| EP | 0 679 968 | A1 | 11/1995 |
| EP | 0 806 710 | A1 | 11/1997 |
| EP | 0 822 470 | A1 | 2/1998 |

OTHER PUBLICATIONS

European Search Report for EP 19 17 8785 dated Oct. 29, 2019.

Office Action dated Jun. 15, 2021 from the China National Intellectual Property Administration in CN Application No. 202010505160.7.

* cited by examiner

Fig. 7

| n | $TI_n$ [ms] | $NR_n$ ($S_{DP}$) | $M_n$ ($S_{DP}$) | $NR_n$ ($S_{DI}$) | $M_n$ ($S_{DI}$) | Inh |
|---|---|---|---|---|---|---|
| 1 | 23.435 | 383.958 | 384 | 95.989 | 96 | |
| 2 | 23.679 | 387.963 | 388 | 96.991 | 97 | |
| 3 | 23.191 | 379.960 | 380 | 94.990 | 95 | |
| .... | | | | | | |
| 232 | 22.947 | 375.963 | 376 | 93.991 | 94 | |
| 233 | 23.008 | 376.960 | 377 | 94.240 | 94 | 1 |
| 234 | 23.191 | 379.961 | 380 | 94.990 | 95 | |
| .... | | | | | | |
| 848 | 23.435 | 383.964 | 384 | 95.991 | 96 | |
| 849 | 23.496 | 384.962 | 385 | 96.241 | 96 | 1 |
| 850 | 23.191 | 379.960 | 380 | 94.990 | 95 | |
| 851 | 23.947 | 375.957 | 376 | 93.989 | 94 | |
| 852 | 23.191 | 379.961 | 380 | 94.990 | 95 | |
| .... | | | | | | |
| 1314 | 23.435 | 383.961 | 384 | 95.990 | 96 | |
| 1315 | 23.191 | 379.960 | 380 | 94.989 | 95 | |
| 1316 | 23.252 | 380.964 | 381 | 95.241 | 95 | 1 |
| 1317 | 23.679 | 387.958 | 388 | 96.989 | 97 | |
| .... | | | | | | |
| 2142 | 23.679 | 387.959 | 388 | 96.990 | 97 | |
| 2143 | 23.923 | 391.962 | 392 | 97.991 | 98 | |
| .... | | | | | | |
| 2729 | 23.984 | 392.963 | 393 | 98.241 | 98 | 1 |
| 2730 | 23.679 | 387.960 | 388 | 96.990 | 97 | |
| 2731 | 23.435 | 383.959 | 384 | 95.990 | 96 | |
| Total | $T_{Mes}$ = 64'007.533 | | TNP($S_{DP}$) = 1'048'810 | | TNP($S_{DI}$) = 262'175 | 110 |

MEASUREMENT OF THE PRECISION OF A TIMEPIECE COMPRISING A CONTINUOUS ROTATION ELECTROMECHANICAL TRANSDUCER IN THE ANALOGUE TIME DISPLAY DEVICE THEREOF

CROSS-REFERENCE TO RELATED APPLICATIONS

This application claims priority to European Patent Application No. 19178785.2, filed on Jun. 6, 2019, the entire contents of which are incorporated herein by reference.

TECHNICAL FIELD

The invention relates to the field of the measurement of the precision of a timepiece comprising a continuous rotation electromechanical transducer, which is either arranged in the kinematic chain linking a power source to an analogue time display, or in kinematic linkage with such a kinematic chain. In particular, the invention relates to the measurement of the rate of such a horological movement, respectively of such a watch, and it also relates to the measurement of the precision of a quartz oscillator forming an internal electronic time base which is suitable for regulating the rotational speed of the electromechanical transducer.

The term rate denotes herein the daily time drift of the time displayed by the timepiece. The precision of the quartz oscillator may also be given in the form of a daily time drift. A daily time drift is measured relative to a very precise external time base which makes it possible to measure time intervals with a very high precision.

According to two main embodiments of the invention, the electromechanical transducer is formed respectively by a small generator linked with the kinematic chain linking a barrel, forming a source of mechanical energy, to an analogue time display and by a continuous rotation motor which is powered by a source of electrical energy and which drives, via a kinematic chain, an analogue time display.

TECHNOLOGICAL BACKGROUND

The electromechanical transducers considered within the scope of the invention are generally reversible, such that they can either produce electrical energy from a source of mechanical energy while enabling regulation of the rotational speed of the rotor by braking this rotor in a controlled manner, or produce mechanical energy, more particularly a motor torque, from an electrical power supply. In the latter case, motor electrical impulses may be supplied to the stator so as to provide either a certain force couple, or a certain rotational speed, particularly a nominal rotational speed in a horological movement. Such transducers are also sometimes known as “electromagnetic transducers”, given that the rotor-stator coupling is of the electromagnetic type. Indeed, in motor mode, to switch from an electric current to a mechanical drive force of a time display mechanism, it is envisaged that such an electric current circulates in at least one coil so as to generate a magnetic field which is coupled with permanent magnets borne by the rotor. In generator mode, to switch from a mechanical drive force of the generator rotor to an electric current, which may power an electronic circuit for regulating the medium rotational speed of the rotor, a force couple rotates the rotor wherein the magnets then induce an electric current in the stator coil.

As regards horological generator designs and possible operations of such generators, reference may be made in particular to the documents EP 0679968, EP 0822470, EP 0935177, EP 1099990, and WO 00/63749. Regarding continuous rotation horological motor designs and possible operations of such continuous rotation motors, reference may be made in particular to the documents FR 2.076.493, CH 714041 and EP 0887913.

For conventional watches of the electromechanical type, i.e. watches comprising an electronic quartz movement associated with a stepping motor, it is known to be able to precisely measure the rate of such watches once they are cased up and ready for use, without having to open a back or a battery hatch. To do this, measurement apparatuses exist arranged to make precise time measurements between the steps of the motor, using a magnetic sensor capable of precisely detecting a certain time relative to each of the electrical impulses supplied to the stepping motors for the driving thereof. The electrical impulses induce magnetic impulses in the stator of the motor to rotate the rotor thereof which is equipped with at least one permanent magnet. The magnetic impulses are propagated partially outside the stator and they may be detected by a magnetic sensor outside the watch. Such measurement apparatuses can precisely determine the rate of the electromechanical watch given that the motor impulses are generated at regular time intervals, particularly each second, these time intervals being determined by the internal electronic time base, i.e. by the quartz oscillator which is inhibited in a manner known to adjust the medium frequency of this time base.

Unlike conventional electromechanical type watches which comprise a stepping motor, the timepieces comprising a continuous rotation electromechanical transducer in the movement thereof, as disclosed above, do not have a perfectly periodic event which is detectable from outside the timepiece by a measurement device of the type described above. Indeed, despite a regulation envisaged to servo-control the medium rotational speed of the continuous rotation electromechanical transducer such that the time displayed is on average correct and that there is no long-term time drift, the instantaneous rotational speed varying about the nominal rotation speed. Thus, in the particular case of a generator watch subject to a braking impulse in each alternation of the induced voltage signal generated in the coils of this generator, if the durations between these braking impulses are measured with suitable means and, as for the electromechanical watch with a stepping motor, a mean of these measurements is carried out to obtain a medium speed, a very long measurement period, for example one day, is then required to obtain the rate of the timepiece with a sufficient precision whereas for the electromechanical watch mentioned above, two minutes for example suffice to obtain the rate with a similar precision. The same problem arises in the particular case of a watch equipped with a continuous rotation motor which would receive a motor impulse at each period of the induced voltage signal mentioned above. Then, in the case where the braking impulses or the motor impulses are not envisaged regularly in each alternation or each period of the induced voltage signal, the measurement becomes even more problematic. It is therefore understood that there is a real need to find a method for measuring the rate of a completed watch wherein the time display mechanism is in kinematic linkage with a continuous rotation electromechanical transducer. ‘Completed watch’ denotes a watch wherein the watch case is closed with the movement mounted therein.

SUMMARY OF THE INVENTION

The aim of the present invention is to provide a method for measuring the rate of a timepiece wherein the time display mechanism comprises a kinematic chain between a motor device and the time display which incorporates a continuous rotation electromechanical transducer, accounting for the fact that the rotational speed of the rotor thereof is generally variable even if it is regulated to be on average equal to a nominal rotational speed.

To this end, the invention generally relates to a method for measuring the medium frequency of a digital signal which is derived from a reference periodic signal generated by an oscillator forming an electronic time base of a timepiece. The timepiece comprises a movement incorporating a mechanism formed by a kinematic chain which is arranged between a motor device of the movement and an analogue time display device, this kinematic chain comprising or being kinematically linked to a continuous rotation electromechanical transducer wherein the medium rotational speed is regulated by a regulation device, associated with the electronic time base, according to a nominal rotational speed. In the case of a continuous rotation motor, it is understood that it forms the abovementioned motor device. The regulation device is arranged to successively supply to the electromechanical transducer regulation impulses to regulate the medium rotational speed thereof, these regulation impulses defining respectively the same events which are synchronised on the rising edges or on the falling edges of said digital signal and which are detectable, by a measurement device without galvanic contact with the movement, at respective detection times having the same time phase-shift with said same events.

The measurement method comprises the following steps:

A) Measurement, without galvanic contact with the movement, of a plurality of successive time intervals each occurring between two detection times which are detected for two respective regulation impulses among the regulation impulses;

B) Determination, for each time interval of the plurality of time intervals, of a corresponding whole number which is equal to the rounded result, to the nearest integer, of the division of this time interval by the theoretical medium period;

C) Summation of the whole numbers determined in step B) for the plurality of time intervals, to thus obtain a total number of periods of said digital signal;

D) Summation of the measured time intervals of the plurality of time intervals, to thus obtain a total measurement duration corresponding to the total number of periods;

E) Calculation of the medium frequency of said digital signal by dividing the total number of periods by the total measurement duration.

For a timepiece having a quartz oscillator forming the internal electronic time base thereof, it will be noted that this quartz oscillator is normally manufactured such that the inherent daily error thereof is positive, i.e. the natural frequency thereof is slightly greater than the theoretical frequency thereof, without however exceeding a maximum daily error, for example fifteen seconds per day.

According to a main embodiment of the measurement method, the digital signal is an inhibited digital signal which has periods of variable durations according to an inhibition of a certain number of periods of the reference periodic signal during successive inhibition cycles. Conventionally, the movement is arranged such that the medium frequency of the inhibited digital signal determines a gain of the indicator organs of the analogue time display device.

According to a preferred alternative embodiment of the main embodiment, the inhibition is performed according to a method which distributes the inhibition of the certain number of periods of the reference periodic signal during each inhibition cycle. Furthermore, the plurality of successive time intervals is envisaged such that the increase in the duration of any time interval among this plurality, resulting from the inhibition of one or more period(s) of the reference periodic signal during this time interval, is at most equal to half the theoretical medium period of the inhibited digital signal.

Then, the precision of the analogue time display device is determined by calculating a relative error given by the result of the division of the difference between the medium frequency of the inhibited digital signal, obtained in step E) mentioned above, and the theoretical medium frequency, for this inhibited digital signal, by this theoretical medium frequency.

Finally, the rate of the timepiece is obtained by multiplying the relative error mentioned above by the number of seconds in one day.

The measurement method according to the invention applies to a timepiece wherein the electromechanical generator is either a generator, or a continuous rotation motor.

BRIEF DESCRIPTION OF THE FIGURES

The invention will be described hereinafter in a detailed manner with the aid of the appended drawings, given by way of non-limiting examples, wherein:

FIG. 7 is a table giving an example of a certain number of time intervals, measured during a measurement period slightly greater than an inhibition cycle, and various numbers derived from these time intervals within the scope of the measurement method according to the invention.

DETAILED DESCRIPTION OF THE INVENTION

Figure 1:
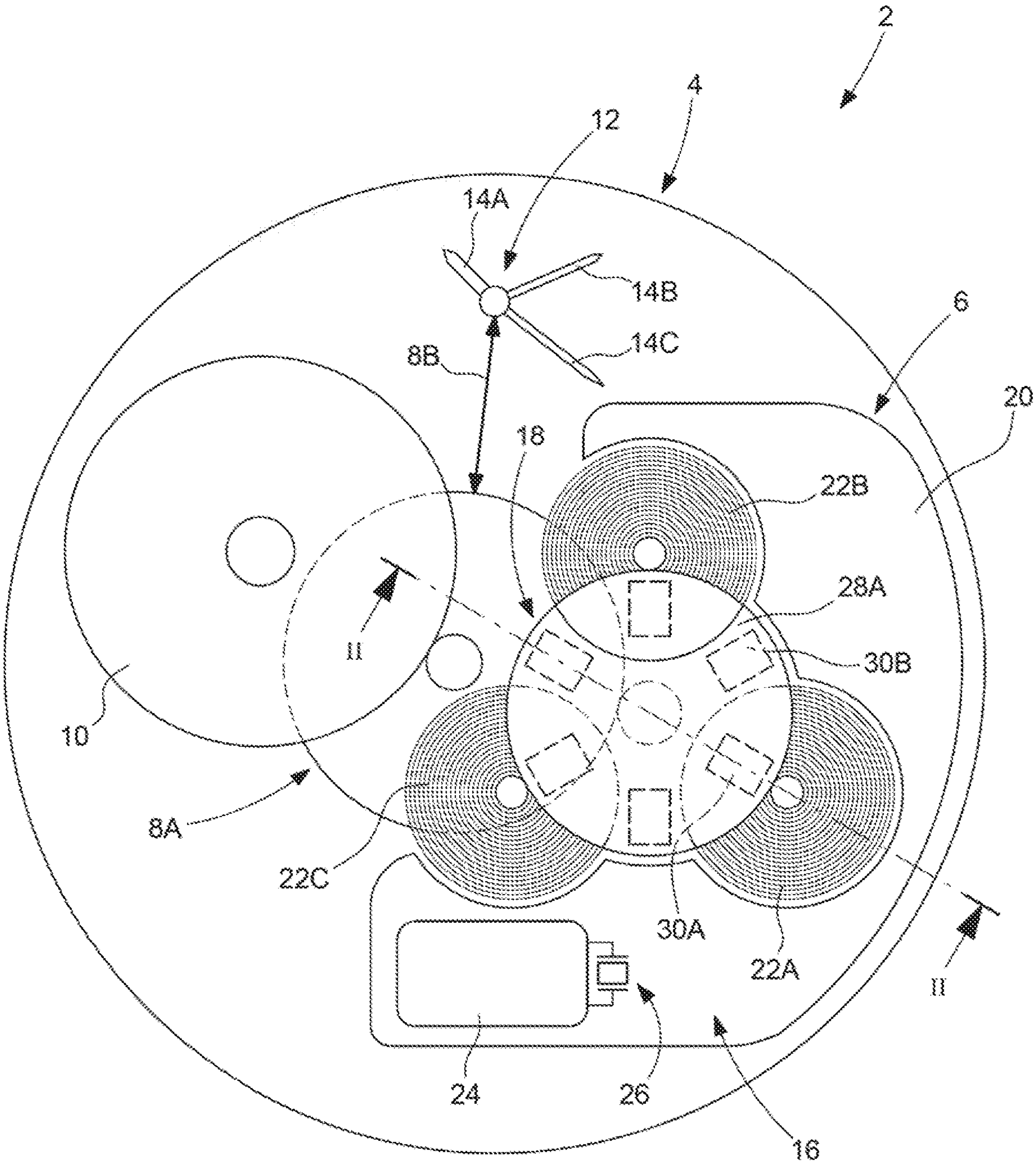
FIG. 1 partially shows a timepiece comprising in the movement thereof a continuous rotation electromechanical generator for which the measurement method according to the invention may be applied.
Figure 2:
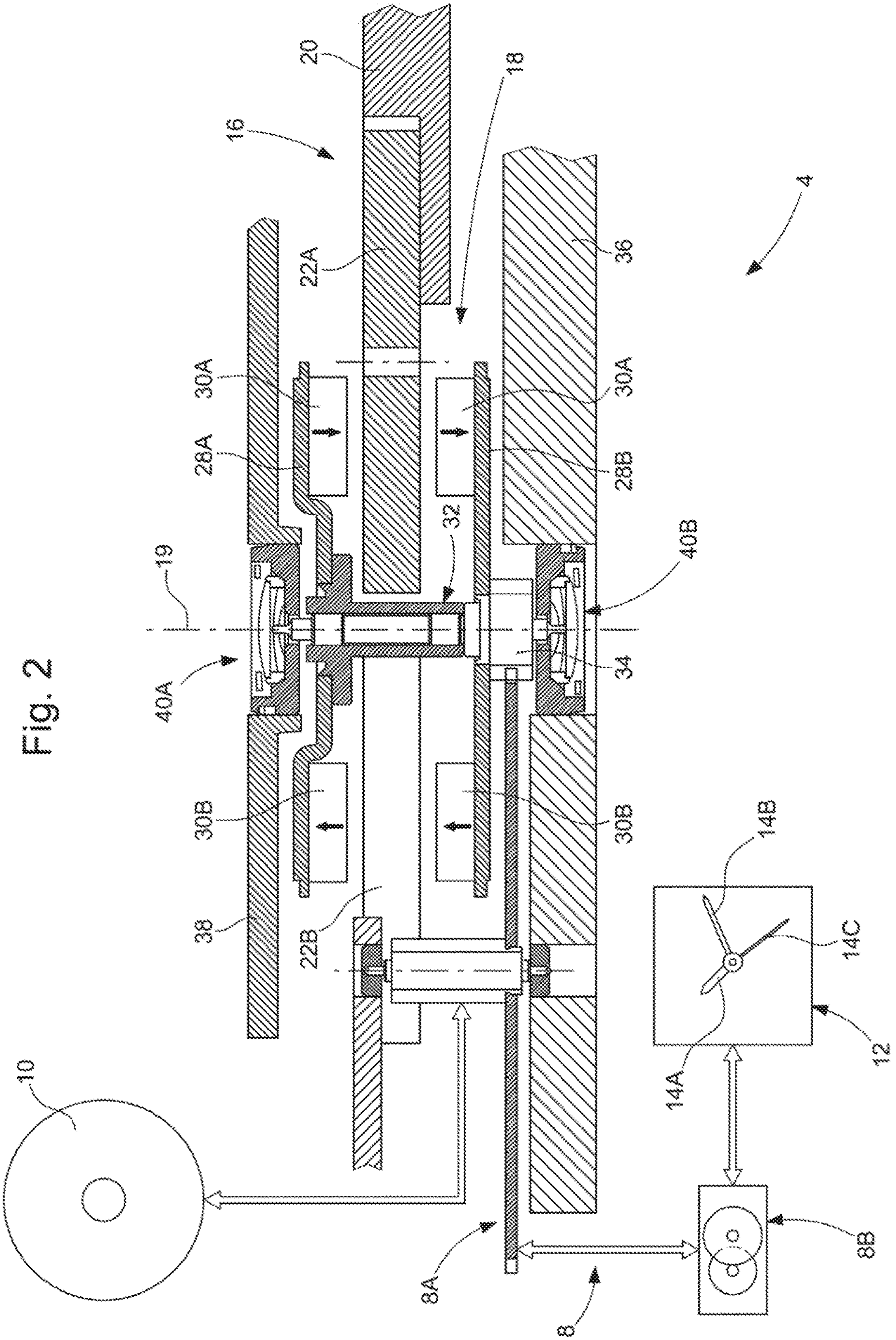
FIG. 2 is a partial cross-sectional view of the movement in FIG. 1, with additionally various elements of this movement represented schematically.

With the aid of the appended figures, an embodiment of the measurement method according to the invention will be described, applied to a timepiece 2 comprising in the movement 4 thereof a continuous rotation electromechanical generator 6 (hereinafter 'the generator'), which has a kinematic linkage 9 with a kinematic chain 8 which is arranged between a barrel 10, defining a source of mechanical energy and forming a motor device, and a time display 12. The kinematic chain 8 comprises, in the alternative embodiment shown, a wheel assembly 8A and a geartrain 8B, represented schematically, engaged with the time display device 12 comprising the hands 14A, 14B, 14C.

As a general rule, the generator 6 is formed by a rotor equipped with permanent magnets and a stator comprising at least one coil through which a variable magnetic flux, which is generated by the magnets of the rotor when the latter is rotating, passes. In the alternative embodiment represented, the stator 16 comprises a support 20 bearing three coils 22A, 22B and 22C arranged regularly about the axis of rotation 19 of the rotor and connected to an electronic circuit 24. The rotor 18 comprises a central shaft 32 bearing two flanges 28A, 28B, preferably made of ferromagnetic material, on each whereof are arranged regularly, about the axis of rotation, six permanent magnets 30A and 30B having alternating polarities. In other words, two adjacent magnets 30A and 30B of the same flange has inverted polarities, whereas two magnets 30A or two magnets 30B, borne respectively by the two flanges and aligned along the direction of the axis of rotation 19, have the same polarity. The shaft 32 of the rotor bears a pinion 34 engaged with the wheel of the wheel assembly 8A. Thus, in the alternative embodiment represented, the kinematic linkage 9 is formed by the gearing of the pinion 34 with the wheel of the wheel assembly 8A.

The movement 4 further comprises a plate 36 and a bridge 38 wherein two bearing blocks 40A and 40B each equipped with a shock-resistant device and wherein the rotor 18 is pivoted are respectively arranged.

Figure 3:
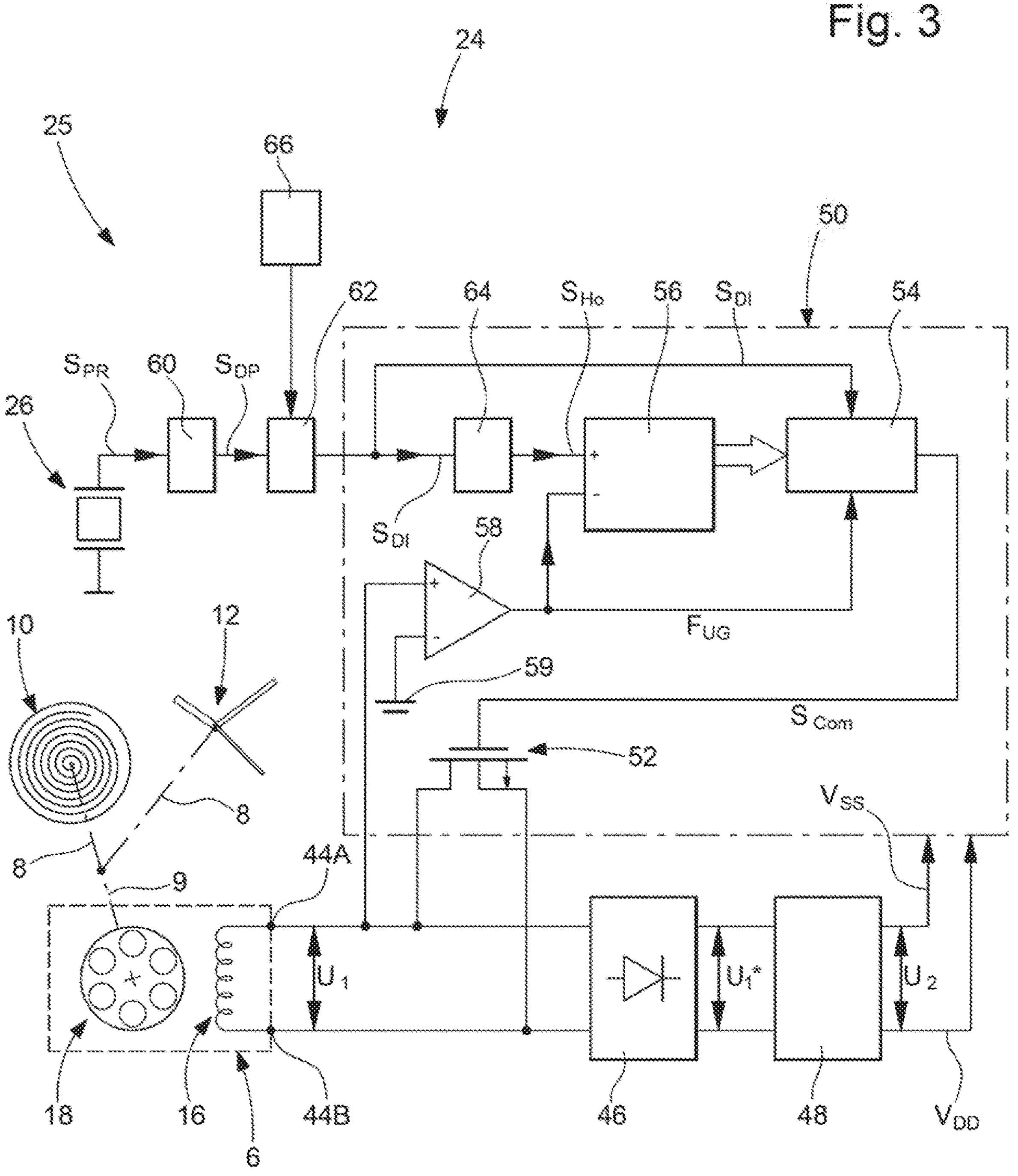
FIG. 3 shows schematically an embodiment of an electronic circuit forming the movement in FIG. 1.

In FIG. 3, the electronic circuit 24 is connected to the terminals 44A and 44B of the coils of the stator 16. When the rotor 18 is rotated, a variable magnetic flux, generated by the rotor magnets, passes through the coils and generates in each thereof an alternating induced voltage. Given that the coils are three in number, that the magnets borne by each flange are six in number with alternating polarities, and that these magnets and these coils are arranged regularly about the axis of rotation of the rotor, the three voltages induced respectively in the three coils are substantially in phase. In a first alternative embodiment, the three coils are arranged in series and the peak voltages are summed substantially. It will be noted that in a second alternative embodiment the three coils may be arranged in parallel. The three coils deliver together, when the rotor is rotated, an alternating voltage $U_1$ to the electronic circuit 24 which comprises a rectifier 46, which supplies a substantially direct voltage $U_1$* to a voltage regulator 48. The voltage regulator supplies a power supply voltage $U_2$ to the electronic circuit, in particular to a circuit 50 for regulating the medium rotational speed of the rotor 18.

The regulation circuit 50 comprises a switch 52, formed by a transistor, which is controlled by a control unit 54. The switch 52 is arranged between the two terminals 44A and 44B of the stator 16, such that when this switch is closed, i.e. conducting, these two terminals are connected electrically and the voltage $U_1$ is nil, the coils 22A-22C of the stator then being short-circuited. When the switch is open, i.e. non-conducting, the voltage $U_1$ is proportional to the induced voltage in the three coils by the magnets of the rotating rotor. The medium rotational speed of the generator 6 is regulated, according to a nominal rotational speed, by a regulation device formed by the regulation circuit 50. The regulation circuit is associated with an electronic time base 25 which is formed by: —a quartz oscillator 26 which generate a reference periodic signal $S_{PR}$, —a first frequency divider 60 which receives the reference periodic signal $S_{PR}$ and which supplies a periodic digital signal $S_{DP}$ the frequency $F_{DP}$ whereof is equal to the natural frequency $F_{NR}$ of the reference periodic signal $S_{PR}$ divided by a given whole number, for example two, and —second frequency divider 62 which receives the signal $S_{DP}$ and which supplies an inhibited digital signal $S_{DI}$ to a logic unit 64, which processes this inhibited digital signal to generate a clock signal $S_{Ho}$. The inhibited digital signal $S_{DI}$ is also supplied to the control unit 54. It will be noted that the first divider and the second divider generally form the first two stages of a division unit which also forms at least a first part of the logic unit 64.

In general, given that the manufacture of quartz oscillators does not enable the obtention of a very precise natural frequency, it is envisaged to produce quartz oscillators having a natural frequency greater than a theoretical reference frequency $F_{RT}$, in a certain given frequency value range. In general, the theoretical reference frequency $F_{RT}$ is equal to 32,768 Hz. In the alternative embodiment described, the frequency divider 60 is a divider by two, such that the theoretical frequency $FT_{DP}$ of the digital signal $S_{DP}$ is equal to 16,384 Hz and the corresponding theoretical period $PT_{DP}$ equals 1/16,384 second. For example, the daily error of non-inhibited quartz oscillators is envisaged between one and twenty seconds.

The second frequency divider is associated with an inhibition unit 66 which, conventionally, inhibits a determined number of impulses in the digital signal $S_{DP}$ to correct a predetermined error of the quartz oscillator 26 resulting from manufacturing tolerances and due to the fact that, as previously stated, quartzes are produced so as to have an excessively high natural frequency in a certain range of frequencies above a theoretical reference frequency $F_{RT}$. Then, for each quartz oscillator produced, the natural frequency $F_{NR}$ thereof is determined and a number of inhibitions per inhibition cycle is calculated, this number of inhibitions being introduced into the inhibition unit 66. In general, the inhibitions are distributed over each of the successive inhibition cycles. In a known alternative embodiment, an inhibition cycle lasts 64 seconds and the number of inhibitions determined is divided by this number of seconds to obtain a unitary inhibition number per second. The latter number is a real number. To each second during an inhibition cycle, the unitary inhibition number is added in a counter and the integer part of the result of the addition performed by this counter is inhibited, subsequently only retaining the remaining fractional part in the counter. Let us take two simple examples: a) the determined inhibition number is 32 and the unitary inhibition is therefore 0.5, such that the inhibition of a period of the periodic digital signal is envisaged every two seconds; b) the determined inhibition number is 96 and the unitary inhibition number is 1.5, such that one inhibition and two inhibitions are envisaged in alternation during the successive seconds of an inhibition cycle. It will be noted that, advantageously, when the unitary inhibition number is greater than one, inhibitions carried out during the same second are not accumulated in the same period of the inhibited digital signal, but are distant by a certain unitary time interval, for example of substantially 125 ms (⅛ second).

It will be noted that the inhibition of periods of the reference signal generated by the quartz, to adjust the precision of an electronic watch and thus reduce the rate thereof, is a technique well-known to those skilled in the art who know of various ways of implementing same. The present invention is therefore not limited to a single possible implementation, but to several known alternative embodiments insofar as certain conditions remain valid, as described hereinafter.

To regulate the speed of the generator, the clock signal $S_{Ho}$ determines a set-point value for the frequency of the induced voltage in the coils, which corresponds to the frequency of the voltage signal $U_1$. This set-point value is a function of the nominal rotational speed of the generator and it is determined by the time base 25, such that it is marred by an error corresponding to that of the time base. A voltage comparator 58, of which one input is connected to one of the terminals 44A, 44B and the other input to a reference voltage 59, generates a signal $F_{UG}$ which is supplied to a reversible counter 56 and to the control unit 54. More particularly, the signal $F_{UG}$ is a digital signal wherein the period corresponds to the electrical period of the generator, i.e. to the period of the induced voltage in the stator thereof and therefore of the voltage $U_1$. This signal $F_{UG}$ decrements the reversible counter 56 at each electrical period detected while the logic unit 64 increments this reversible counter at each period of the clock signal $S_{Ho}$. Thus, the reversible counter integrates, from a start time, a time drift of the generator and therefore of the analogue time display relative to a set-point gain determined by the set-point value which is derived from the inhibited digital signal supplied by the internal time base 25. The state of the reversible counter is supplied to the control unit 54 which manages the medium rotational speed of the generator according to a given method.

The regulation circuit 50 is arranged to successively supply regulation impulses to the generator to regulate the medium rotational speed thereof such that it is as close as possible to a nominal rotational speed envisaged for the generator rotor. The regulation impulses are formed herein by braking impulses of the generator rotor which are each generated by a momentary short-circuit of the coil(s) forming the stator of this generator. The nominal rotational speed is determined by the design of the movement 4, in particular by the kinematic chain 8 and the kinematic linkage 9. In the alternative embodiment described herein, the nominal rotational speed is equal to 64/9=7.1111 revolutions per second. For the generator described above, the nominal electrical frequency of the alternating voltage signal $U_1$ is that of the induced voltage in the three coils thereof. It equals triple the nominal rotational speed, i.e. 64/3=21.3333 Hz. Thus, the nominal electrical period equals 46.875 ms and the nominal duration of an alternation of the signal $U_1$ is equal exactly to 23.4375 ms.

Figure 4:
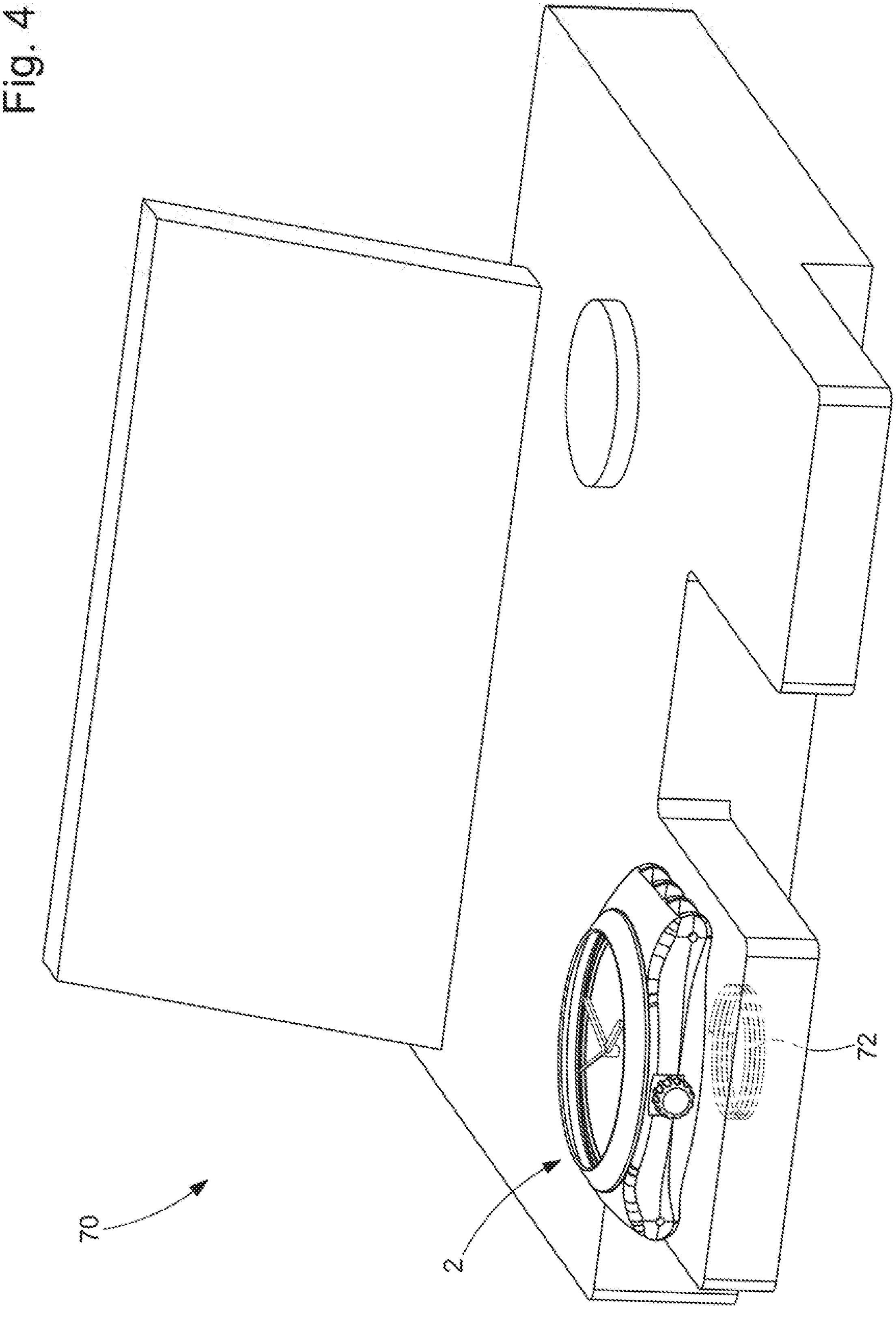
FIG. 4 is a schematic perspective view of a measurement device for carrying out the measurement method according to the invention.

In FIG. 4 a measurement device 70 is shown schematically, suitable for carrying out the measurement method according to the invention, by means of suitable software, the content whereof will become obvious on reading the detailed description of this measurement method. The measurement device 70 comprises a detection coil 72 capable of detecting a variation of a magnetic field from the timepiece 2. Indeed, a variation of the magnetic field generates an induced voltage in the detection coil. By way of example, the measurement device 70 may be materially an apparatus known as 'Analyzer Twin' from the company Witschi Electronic SA in Büren in Switzerland, wherein specific software for carrying out the measurement method according to the invention is implemented. Further similar measurement apparatuses for electronic watches may also be used. Indeed, it is not necessary that the measurement apparatus also be able to be used for mechanical watches, as is the case of the 'Analyser Twin' model.

Figure 6:
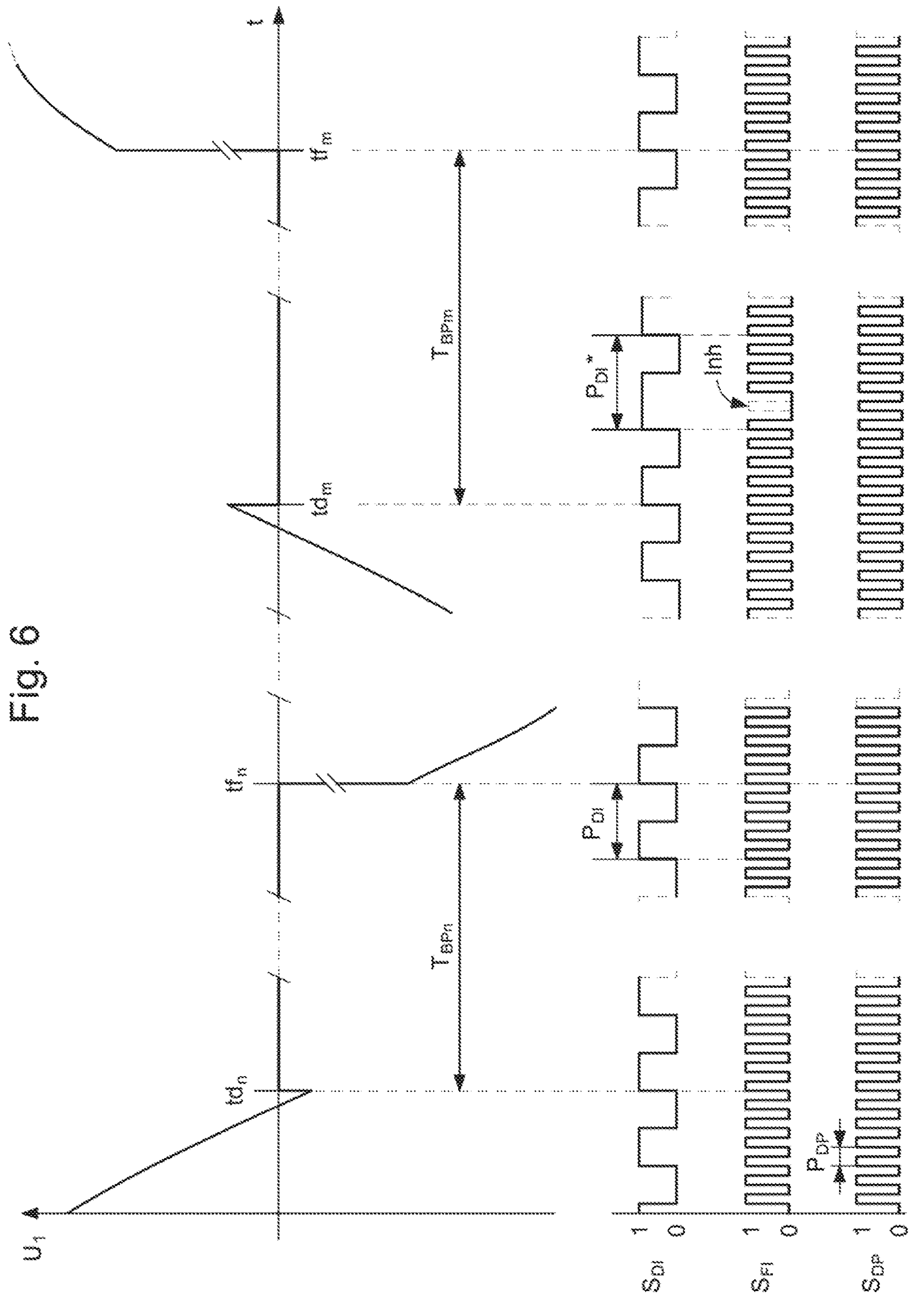

As a general rule, the measurement method according to the invention envisages measuring, in particular for a timepiece 2 such as a wristwatch or for a movement 4 ready to be cased up, the medium frequency of an internal digital signal of the electronic circuit of the movement 4, this digital signal being derived from the reference periodic signal $S_{PR}$ generated by the quartz oscillator 26 forming the electronic time base 25 of this movement 4. It is envisaged that the medium rotational speed of the generator 6 is regulated by a regulation circuit, associated with the electronic time base, according to a nominal rotational speed. The regulation device is arranged to be able to successively supply braking impulses to the generator by short-circuiting the terminals 44A and 44B of the coils of the stator 16 of the generator in order to regulate the medium rotational speed thereof. The control unit 54 of the regulation device generates each of the braking impulses as follows: When it is envisaged to generate a braking pulse with a view to regulating the rotational speed of the generator, particularly according to the state of the reversible counter 56 or optionally also further detected events, the control unit waits to detect in the digital signal $F_{UG}$ from the comparator 58, according to the alternative embodiment, either a next rising edge, or a following edge among the rising and falling edges; then it triggers directly or after a given delay the braking pulse, via the control signal $S_{Com}$ that it supplies to the switch 52, by closing this switch at a time $td_n$, n=1, 2, 3, . . . . In a specific alternative embodiment, as shown in FIG. 6, the control signal $S_{Com}$ switches from the logic state '0' thereof (switch open) to the logic state '1' thereof (switch closed and therefore conducting) at the first rising edge of the inhibited digital signal $S_{DI}$, received by the control unit to temporally manage the braking impulses, following the edge in question of the signal $F_{UG}$. In a further specific alternative embodiment, it is envisaged to start a braking impulse at the first edge detected, rising or falling, of the signal $S_{DI}$ following the detection of the zero intercept in question of the voltage signal $U_1$.

Figure 5A:
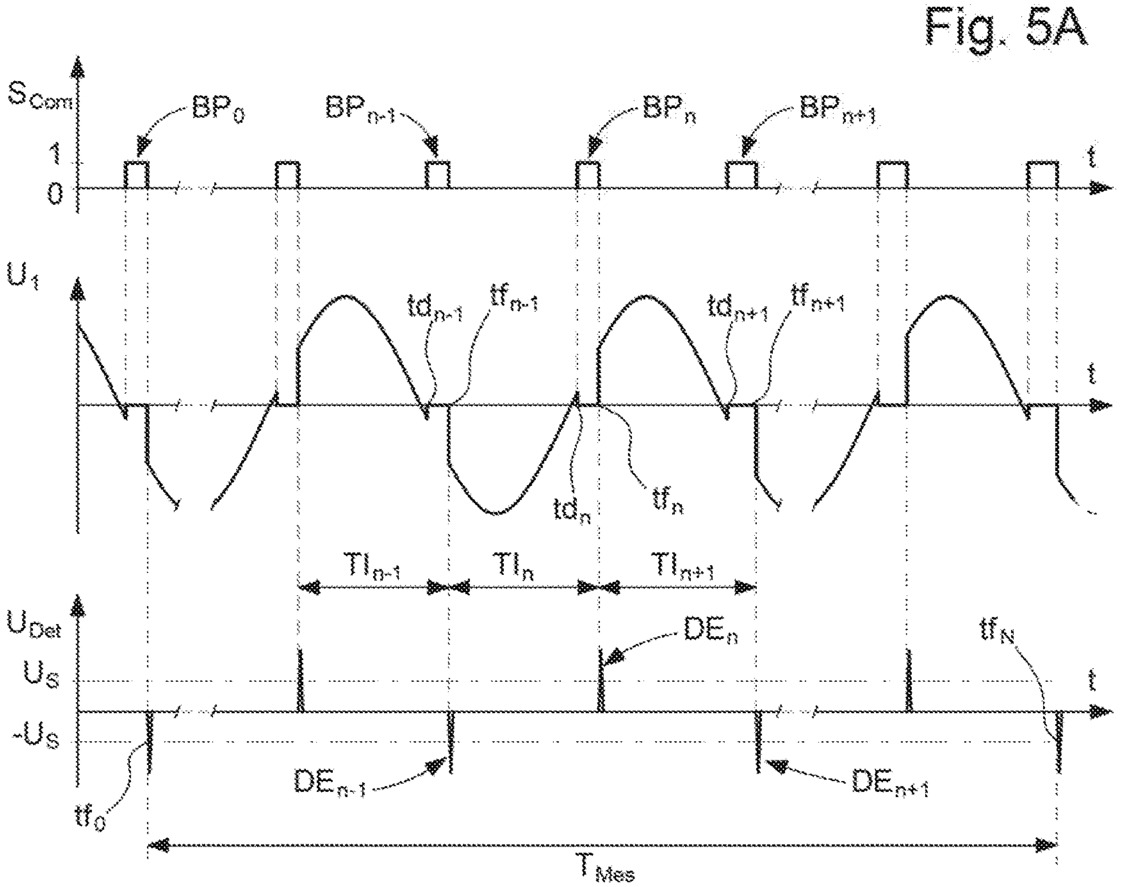
FIGS. 5A and 5B show a voltage signal at the two terminals of the stator of the generator of the movement in FIG. 1 and the detection of magnetic field impulses received by the measurement device in FIG. 4 for respectively two regulation modes of the rotational speed of the generator rotor, FIG. 6 partially shows, in an enlarged view, the voltage signal represented in FIGS. 5A and 5B as well as various digital signals occurring in the electronic circuit of the movement to pace the gain of the time display organs and to enable the regulation of the rotational speed of the electromechanical transducer.

Within the scope of the invention, the regulation impulses respectively define the same events which are synchronised on the rising edges or on the falling edges of the inhibited digital signal $S_{DI}$ and which are detectable, by a measurement device without galvanic contact with the movement and preferably by a magnetic field sensor 72, at corresponding detection times. In a main embodiment of the measurement method according to the invention described with the aid of the figures, this event is the end of each braking impulse. As shown in FIG. 6, the respective ends $tf_n$, n=1, 2, 3, . . . , of the braking impulses $BP_n$ are synchronised and furthermore in phase with rising edges of the inhibited digital signal $S_{DI}$ and also with rising edges of the periodic digital signal $S_{DP}$. It will be noted that, due to the generation of the signal $S_{DI}$, the rising edges of this signal $S_{DI}$ are in phase with the corresponding rising edges of the periodic digital signal $S_{DP}$. The braking impulses $BP_n$ are identified in the figures either by corresponding control impulses of the control signal $S_{Com}$ (FIGS. 5A and 5B), or by extended zones (i.e. non-point-based) of the voltage U1 where the latter has a nil value (FIG. 6), resulting from the control impulses. The braking impulses $BP_n$ have braking durations $T_{BPn}$.

In the alternative embodiment represented, the signal $S_{DI}$ has a medium frequency $FM_{DI}$ which is, over an inhibition cycle, slightly less than a quarter of the medium frequency $FM_{DP}$ of the periodic digital signal $S_{DP}$. The inhibited digital signal $S_{DI}$ is derived from the signal $S_{DP}$ with the application of the inhibition envisaged to correct the relative error of the quartz oscillator. To generate the inhibited digital signal $S_{DI}$, the periodic digital signal $S_{DP}$ is divided twice by two in the divider 62 by applying the inhibition during the first of these successive two divisions by two. To explain how the inhibition occurs, in FIG. 6 an inhibited imaginary signal $S_{FI}$ is introduced having, outside the periods subject to inhibition, the frequency of the signal $S_{DP}$. Without inhibition, the period $P_{DI}$ of the signal $S_{DI}$ equals exactly four times the period $P_{DP}$ of the signal $S_{DP}$. However, when an inhibition 'Inh' occurs during the first division by two of the signal $S_{DP}$, a period $P_{DP}$ of this signal is inhibited, i.e. it is disregarded and therefore not taken into account, such that the period $P_{DI}$* of the signal $S_{DI}$ generated during this inhibition is greater than that of the period $P_{DI}$, since the period $P_{DI}$* actually has a duration equal to five times the period $P_{DP}$. It is therefore understood that $P_{DI}^*=1.25\cdot P_{DI}$ (+25%). The inhibited digital signal $S_{DI}$ is therefore characterised by a medium frequency $FM_{DI}$ and a medium period $PM_{DI}$. As the clock signal $S_{Ho}$ is determined by the signal $S_{DI}$ and this clock signal determined a set-point value for the frequency of the induced voltage in the coils of the generator, for the signal $S_{DI}$ a theoretical medium frequency $FMT_{DI}$ and a corresponding theoretical medium period $PMT_{DI}$ are envisaged which are dependent respectively on the nominal electrical frequency and the nominal electrical frequency of the voltage $U_1$ (which are equal to those of the induced voltage). Over an inhibition cycle, the frequency $F_{DP}$ of the periodic digital signal $S_{DP}$ may also vary slightly, such that over an inhibition cycle $C_{Inh}$ and also over the total measurement duration $T_{Mes}$ the signal $S_{DP}$ has a medium frequency $FM_{DP}$ and a corresponding medium period $PM_{DP}$. Then, to the period $P_{DP}$ of the signal $S_{DP}$ and to the medium period $PM_{DP}$ corresponds the same theoretical period $PT_{DP}$, also known as theoretical medium period $PT_{DP}$, and the same corresponding theoretical frequency $FT_{DP}$, also known as theoretical medium frequency. The theoretical frequency $FT_{DP}$ is, by design of the oscillator of the time base, less than the medium frequency $FM_{DP}$.

In the alternative embodiment described in the figures, the theoretical frequency $FT_{DP}$=16,384 Hz and the theoretical period $PT_{DP}$=1/16,384 second. Then, the theoretical medium frequency $FMT_{DI}$ equals $FT_{DP}/4$, i.e. $FMT_{DI}$=4,096 Hz, and the theoretical medium period $PMT_{DI}$=1/4,096 second. Finally, it will be noted that the natural frequency $F_{NR}$ of the reference periodic signal $S_{PR}$ also has, over an inhibition cycle or a total measurement duration, a medium natural frequency $FM_{NR}$ which equals double the medium frequency $FM_{DP}$ of the signal $S_{DP}$. To these frequencies $F_{NR}$ and $FM_{NR}$ corresponds the theoretical reference frequency $F_{RT}$=32,768 Hz, which is, by design of the oscillator, less than the natural frequency $F_{NR}$.

With the aid of FIGS. 4, 5A, 6 and 7, the measurement method according to the invention will be described in more detail for a first regulation mode of the medium rotational speed of the electromechanical transducer wherein the regulation device is arranged to generate regulation impulses in such a way that, in normal operation, any two successive regulation impulses have between the respective starts $td_n$ thereof approximately the same positive whole number of alternations of the induced voltage signal which is generated by the magnets of the rotor in the coil(s) of the stator when the rotor is rotating. In this first regulation mode, the regulation of the medium rotational speed of the rotor is obtained through a variation of the duration $T_{BPn}$ of the regulation impulses. In the alternative embodiment described herein for a generator wherein the medium rotational speed is regulation by braking impulses, it is envisaged to generate a braking impulse at each alternation. The measurement method comprises the following steps:

A) Measurement by the measurement device 70, which comprises or is associated with a very precise external time base, of a plurality of successive time intervals $TI_n$, n=1, 2, 3, . . . , N, each occurring between two detection times corresponding respectively to two end times $tf_{n-1}$ and $tf_n$ of two successive braking impulses $BP_{n-1}$ and $BP_n$;

B) Determination, for each time interval $TI_n$ of the plurality of time intervals $TI_n$, n=1, 2, 3, . . . , N, of a whole number $M_n(S_{DP})$ which is equal to the rounded result $NR_n(S_{DP})$, to the nearest integer, of the division of this time interval $TI_n$ by the theoretical period $PT_{DP}$ of the periodic digital signal $S_{DP}$, i.e. $NR_n(S_{DP})=TI_n/PT_{DP}=TI_n\cdot FT_{DP}$, or/and a whole number $M_n(S_{DI})$ which is equal to the rounded result $NR_n(S_{DI})$, to the nearest integer, of the division of the time interval $TI_n$ by the theoretical medium period $PMT_{DI}$ of the inhibited digital signal $S_{DI}$, i.e. $NR_n(S_{DI})=TI_n/PMT_{DI}=TI_n\cdot FMT_{DI}$;

C) Summation of the whole numbers $M_n(S_{DP})$, respectively $M_n(S_{DI})$ determined in step B) for the plurality of time intervals $TI_n$, n=1, 2, 3, . . . , N, to thus obtain a total number of periods TNP ($S_{DP}$), respectively TNP ($S_{DI}$) of the periodic digital signal $S_{DP}$, respectively of the inhibited digital signal $S_{DI}$;

D) Summation of the time intervals $TI_n$ of the plurality of time intervals measured in step A), to thus obtain a total measurement duration $T_{Mes}$ corresponding to the total number of periods TNP ($S_{DP}$), respectively TNP ($S_{DI}$);

E) Calculation of the medium frequency $FM_{DP}$, respectively $FM_{DI}$ of the signal $S_{DP}$ or/and of the signal $S_{DI}$ by dividing the total number of periods TNP ($S_{DP}$), respectively TNP ($S_{DI}$) by the total measurement duration $T_{Mes}$, i.e. $FM_{DP}$=TNP $(S_{DP})/T_{Mes}$ and $FM_{DI}$=TNP $(S_{DI})/T_{Mes}$.

In step A), the end times are detected herein by a magnetic sensor 72 of the measurement device which is arranged to be able to detect short induced voltage impulses $DE_n$, n=1, 2, 3, . . . , occurring at the end of the braking impulses $BP_n$ given the sudden drop in the induced current in the generator stator coils when the switch 52 is opened (rendered non-conducting) at the end of each braking impulse. To detect specifically the same specific time of the induced voltage impulses $DE_n$, two comparators in parallel are envisaged which detect, on the rising edge of these impulses, the time when the induced voltage reaches a threshold voltage Us or $-U_S$ respectively for positive and negative impulses succeeding each other in alternation, given that the braking impulses are carried out at each alternation of the voltage $U_1$ at the terminals of the stator 16 of the generator 6. It will be noted that the detection times have the same small time phase-shift with the respective ends of the corresponding braking impulses.

As stated above, within the scope of the invention, it is envisaged to measure either the medium frequency $FM_{DI}$ of the inhibited digital signal $S_{DI}$, so as to be able to finally determine the rate of the timepiece, or the medium frequency $FM_{DP}$ of the periodic digital signal $S_{DP}$ so as to be able to determine the precision of the oscillator 26 (generally a quartz oscillator) supplying the reference periodic signal $S_{PR}$. Thus, in a first alternative embodiment, the digital signal is the periodic digital signal $S_{DP}$ wherein the medium frequency $FM_{DP}$ is equal to the medium natural frequency $FM_{NR}$, over the total measurement duration $T_{Mes}$, of the reference periodic signal $S_{PR}$ divided by a given whole number, for example by two. The precision of the oscillator is determined by calculating a relative error $ER(S_{DP})$ given by the result of the division of the difference between the medium frequency $FM_{DP}$ of the signal $S_{DP}$, obtained in step E), and the theoretical frequency $FT_{DP}$ of this signal $S_{DP}$ by this theoretical frequency, i.e. $ER(S_{DP})=(FM_{DP}-FT_{DP})/FT_{DP}$. It will be noted that the relative error of the reference periodic signal $S_{PR}$ generated by the oscillator 26 is identical, i.e. $ER(S_{PR})=ER(S_{DP})$. In a second alternative embodiment, the digital signal is therefore the inhibited digital signal $S_{DI}$ which has periods $P_{DI}$ and $P_{DI}$* of variable durations according to an inhibition of a certain number of periods of the reference periodic signal during successive inhibition cycles. The medium frequency $FM_{DI}$ of the inhibited digital signal determining a gain of the indicator organs 14A to 14C of the analogue time display device 12, the precision of the analogue time display device is determined by calculating a relative error $ER(S_{DI})$ given by the result of the division of the difference between the medium frequency $FM_{DI}$ of the inhibited digital signal $S_{DI}$, obtained in step E), and the theoretical medium frequency $FMT_{DI}$ of this signal $S_{DI}$ by this theoretical medium frequency, i.e. $ER(S_{DI})=(FM_{DI}-FMT_{DI})/FMT_{DI}$. The rate of the timepiece is obtained by multiplying the relative error $ER(S_{DI})$ by the number of seconds in one day, i.e. Rate=$ER(S_{DI})\cdot 86{,}400$[s/day].

By way of example, taking the measurement results given in the table in FIG. 7, there are a total measurement duration $T_{Mes}$=64.007533 seconds, the total number of periods TNP ($S_{DP}$)=1,048,810 and the total of periods TNP ($S_{DI}$)=262,175. This gives:

$FM_{DP}$=16,385.7276, and $FM_{DI}$=4,096.002263.

Where $FT_{DP}$=16,384 Hz and $FMT_{DI}$=4,096 Hz, this gives:

$ER(S_{PR})=ER(S_{DP})=105\cdot 10^{-6}$=105 ppm, and $ER(S_{DI})$=0.5525 ppm.

$ER(S_{PR})$ corresponds herein about to 9 s/day while $ER(S_{DI})$ corresponds to a Rate=0.0477 [s/day], and therefore to an annual error of about 17.5 s for an annual medium reference frequency which would correspond to the medium reference frequency $FM_{NR}$ given by the double of $FM_{DP}$, i.e. $FM_{NR}$=32,771.5 Hz.

It will be noted that the time intervals $TI_n$ follow one another without interruption. Thus, the total measurement duration $T_{Mes}$ consists of a plurality of time intervals $TI_n$, n=1, 2, 3, . . . , N, which are contiguous, these time intervals being measured by measurement device very precisely. The total measurement duration $T_{Mes}$ therefore corresponds to an uninterrupted period of time between a start time $tf_0$ and an end time $tf_N$. This advantageous alternative embodiment is optional for the measurement of the medium frequency of the periodic digital signal $S_{DP}$, but it is preferable for the inhibited digital signal $S_{DI}$ as the inhibitions do not generally occur at each time interval $TI_n$ and these inhibitions are not necessarily distributed perfectly homogeneously over time.

It will be noted that the total measurement duration $T_{Mes}$ is envisaged very slightly greater than the duration of an inhibition cycle $C_{Inh}$ which equals herein theoretically 64 seconds. In fact, the last time interval $TI_n$ corresponds to the time interval, between two ends $tf_{N-1}$ and $tf_N$ of braking impulses, during which the end of a time measurement of an inhibition cycle $C_{Inh}$ from the end time $tf_0$ of an initial braking impulse $BP_0$ occurs, this time $tf_0$ being selected as the start of the measurement. The time measurement of an inhibition cycle is also performed by the measurement device which comprises or is associated with a very precise external time base, for example an atomic time base. In the alternative embodiment represented, the total number N of contiguous time intervals is equal to 2731, i.e. N=2731. The nominal electrical frequency of the voltage signal $U_1$ is equal to 64/3 Hz. The nominal electrical period therefore equals 46.8750 milliseconds. Thus, the nominal duration of an alternation of the voltage signal $U_1$ equals 23.4375 ms. 2731 alternations at this nominal duration gives a total duration slightly greater than 64 s, i.e. 64.0078125 s. It will be noted that the nominal duration of an alternation corresponds exactly to 96 theoretical medium periods $PMT_{DI}$=1/4,096 s of the signal $S_{DI}$ and to 384 theoretical periods $PT_{DP}$=1/16,384 s of the signal $S_{DP}$.

The table in FIG. 7 gives the plurality of time intervals $TI_n$, n=1, 2, 3, . . . , N=2731, obtained in step A) of the measurement method, as well as the real numbers $NR_n(S_{DP})$ and $NR_n(S_{DI})$ and the corresponding rounded whole numbers $M_n(S_{DP})$ and $M_n(S_{DI})$ obtained in step B) of this measurement method. Given that the rotational speed of the generator varies, it is observed that the whole numbers $M_n(S_{DP})$ and $M_n(S_{DI})$ are variable about the respective nominal whole numbers 384 and 96. As a factor '4' is envisaged between the nominal whole numbers 96 and 384, and given that the detected events $DE_n$ are synchronous with rising edges of the inhibited digital signal $S_{DI}$, the nominal whole numbers $M_n(S_{DP})$ are even numbers in the absence of inhibition during corresponding time intervals $TI_n$ and odd numbers when an inhibition occurs during the corresponding time intervals (at most one inhibition per time interval is envisaged in the alternative embodiment described herein). Thus, the time intervals during which the inhibitions occur may be readily determined in the table in FIG. 7.

The total number of inhibitions in the alternative embodiment described is equal to 110. This number is equal to the difference between the total number of periods TNP ($S_{DP}$)=1,048,810 and the total of periods TNP ($S_{DI}$)=262,175 multiplied by the factor '4' mentioned above. By means of the rounding performed in the measurement method according to the invention, it is possible to determine both the effective number of periods of the periodic digital signal $S_{DP}$, which is not inhibited, and the effective number of periods of the inhibited digital signal $S_{DI}$, which is derived from the signal $S_{DP}$ with the application of the inhibition process to correct the error of this signal $S_{DP}$. The consequence of the rounding performed on the real numbers $NR_n(S_{DI})$ to obtain the whole numbers $M_n(S_{Di})$ is that these whole numbers $M_n(S_{Di})$ are independent due to an inhibition having taken place or not during the corresponding time interval $TI_n$. Thus, by means of the measurement method according to the invention, despite the fact that the electromechanical transducer has a variable rotational speed, the effective numbers of periods of the inhibited digital signal $S_{DI}$ during the time intervals $TI_n$, which are dependent on the regulation impulses applied to the electromechanical transducer, are determined, these regulation impulses optionally occurring during each of these time intervals. Furthermore, within the scope of the measurement method according to the invention, it is possible to determine the effective numbers of periods of the periodic digital signal $S_{DP}$, which is not inhibited, during the time intervals $TI_n$ and thus determine, besides the precision of the internal oscillator, the number of inhibitions per inhibition cycle envisaged for the timepiece in question and which is stored, at the time of the measurement, in a memory of the inhibition unit 66 or an internal memory accessible to this inhibition unit. It will be noted that this number of inhibitions may generally be replaced or corrected, particularly following an observation that the rate of the timepiece is not optimal or outside a specific range envisaged for the timepiece in question. The theoretical real number $NT_{IC}$ of inhibitions per inhibition cycle to be envisaged is calculated readily by multiplying the duration of an inhibition cycle $C_{Inh}$ by the relative error $ER(S_{PR})$ of the reference frequency and by dividing the result by the medium period $PM_{DP}$ of the periodic digital signal $S_{DP}$ whereon the inhibitions are performed, i.e. $NT_{IC}=C_{Inh}\cdot ER(S_{DP})/PM_{DP}$ as $ER(S_{PR})=ER(S_{DP})$. For the alternative embodiment described, this gives $NT_{IC}=110.112$.

In a further alternative embodiment, a braking impulse is envisaged at each period of the voltage $U_1$, such that only the positive induced voltage impulses $DE_{2n-1}$ or only the negative induced voltage impulses DE2*n* appear (see FIG. 5A), according to whether the braking impulses are applied during the rising edges or the falling edges of the voltage signal $U_1$, and they are detected using a single voltage comparator with the threshold voltage $U_S$, respectively $-U_S$. The theoretical medium duration of the time intervals is then equal to 46.8750 ms.

To ensure a high precision of the measurement method according to the invention, three conditions described hereinafter are advantageously to be fulfilled.

The first condition sets a maximum duration for the measured time intervals $TI_n$. The measurement of the plurality of successive time intervals $TI_n$ in step A) is performed such that each is less than a maximum duration $TI_{Max}$ which is equal to the theoretical medium period for the digital signal in question divided by double the maximum relative error $ER_{Max}$ for the natural frequency $F_{NR}$ of the reference periodic signal $S_{PR}$ relative to a theoretical reference frequency $F_{RT}$, i.e. $TI_{Max}(S_{DP})=PT_{DP}/2\cdot ER_{Max}(F_{NR})$ for the measurement of the medium frequency $FM_{DP}$ of the periodic digital signal $S_{DP}$, i.e. $TI_{Max}(S_{DI})=PMT_{DI}/2\cdot ER_{Max}(F_{NR})$ for the measurement of the medium frequency $FM_{DI}$ of the inhibited digital signal $S_{DI}$. As the measurement method is based on a rounding to the nearest integer value, to obtain a whole number of periods $M_n(S_{DP})$, respectively $M_n(S_{DI})$ of the digital signal in question which corresponds for each time interval $TI_n$ to the effective whole number of periods of the digital signal in question, each real number obtained $NR_n(S_{DP})$, respectively $NR_n(S_{DI})$ must deviate from the maximum by a half-period of the digital signal in question relative to the whole number $M_n(S_{DP})$, respectively $M_n(S_{Di})$. As $PMT_{DI}=4\cdot PT_{DP}$, it is understood that the strictest condition for the measurement of the medium frequency $FM_{DP}$ of the signal $S_{DP}$ and therefore of the precision of the oscillator of the internal time base. Furthermore, for the signal $S_{DI}$, as inhibitions are envisaged to correct the error of the oscillator and these inhibitions are generally distributed during the inhibition cycles, the first condition discussed herein is not necessary to ensure a high measurement precision but it makes it possible to provide a high precision in all cases. By way of numerical example, if a maximum oscillator of twenty seconds/day is chosen, $ER_{Max}(F_{NR})$ equals approximately 230 ppm (0.00023), $TI_{Max}(S_{DP})=$ 132.7 ms and $TI_{Max}(S_{DI})=530.8$ ms. In the alternative embodiment in question, the theoretical duration of an alternation of the signal $U_1$ is equal to 23.4375 ms, such that at least one braking impulse every five alternations is needed to measure the medium frequency of the oscillator precisely, respectively at least one braking impulse every twenty-two alternations to measure precisely, in the absence of inhibition during at least one of the time intervals $TI_n$, the medium frequency of the inhibited digital signal and therefore the rate of the timepiece.

The second condition relates to the maximum number of inhibitions that may occur during each time interval $TI_n$. With the aim of obtaining a whole number of periods $M_n(S_{DI})$ of the inhibited digital signal $S_{DI}$ that corresponds, for each of the time intervals $TI_n$, to the effective whole number of periods of this inhibited digital signal, the plurality of successive time intervals is envisaged such that the increase of the duration of any time interval among this plurality, resulting from the inhibition of one or more period(s) of the reference periodic signal during this time interval, is at most equal to half the theoretical medium period $PMT_{DI}$ of the inhibited digital signal (it being understood that a number equaling an integer and a half is rounded to this integer). In the alternative embodiment described, periods of the periodic digital signal $S_{DP}$ are inhibited. As the ratio between the theoretical medium period $PMT_{DI}$ of the inhibited digital signal and the theoretical period $PT_{DP}$ of the signal $S_{DP}$ equals four, i.e. $PMT_{DI}=PT_{DP}/4$, this second condition implies for this alternative embodiment that there are at most two inhibitions per time interval $TI_n$. As the period $P_{DP}$ of the signal $S_{DP}$ is practically less than the theoretical period $PT_{DP}$, there is a certain margin by limiting the inhibitions per measured time interval to two inhibitions.

It will be noted that the second condition is advantageous to provide a high measurement precision in all cases, but it is not necessary in all cases. Indeed, in an embodiment of the inhibition process which distributes the inhibitions during an inhibition cycle according to a substantially uniform schedule, for example by distributing at best the number of inhibitions in subperiods of the inhibition cycles and avoiding carrying out in these subperiods more than two impulses in a short time interval, there could be more than two inhibitions per time interval if the time intervals $TI_n$ are, in an alternative embodiment, relatively long. With a braking impulse for every alternation, as in the alternative embodiment described above, it is observed that the maximum number of inhibitions during each alternation is indeed equal to two. In the table in FIG. 7, let us take the time interval $TI_{233}$ where an inhibition already occurs, this gives $NR_{233}(S_{DI})=94.240$. If a further inhibition were added, this would give approximately $NR(S_{DI})=94.490$ which is rounded correctly to $M(S_{DI})=94$. With three inhibitions, we would have $NR(S_{DI})$ greater than 94.50, which would induce an error in the count of the effective number of periods of the inhibited digital signal. On the other hand, if the time interval $TI_n$ had a sufficiently long duration such that the error induced by the oscillator is greater than the theoretical period $PT_{DP}$ of the signal $S_{DP}$, then there could be three inhibitions during such a time interval and always a correct rounding to the number of effective periods of the signal $S_{DI}$. According to the calculations and results given in relation to the first condition described above, it can therefore be concluded that there could be three inhibitions during a time interval greater than 22 alternations of the voltage signal U1, i.e. at least 23 alternations between two braking impulses determining the time interval in question and preferably at least 24 alternations, i.e. 12 electrical periods. Thus, those skilled in the art can understand that there is a certain link between the time intervals which are measured during the implementation of the measurement method according to the invention and the inhibition process to be envisaged, and therefore that there is a certain relationship between the number of regulation impulses per unit of time, during the implementation of the measurement method according to the invention, and the mode of distribution of the inhibitions during the inhibition cycles.

The third condition to ensure a high measurement precision relates to the total measurement duration $T_{Mes}$ for measuring the medium frequency of the inhibited digital signal and the rate of the timepiece. As stated, conventional inhibition processes envisage distributing the inhibitions during each inhibition cycle. In a particular embodiment, the inhibitions, of which the maximum whole number per inhibition cycle is 255 or 511, are distributed per second. An inhibition cycle lasts theoretically 64 [s]. As already described above, in each subperiod of a second, a whole number of inhibitions, corresponding to the integer value of the total number of inhibitions envisaged divided by 64, is performed, and an additional inhibition corresponding to the summation of the fractional parts during the seconds is periodically added, whenever this summation exceeds the unit. In each subperiod of one second, it is envisaged to perform the inhibitions every TU=125 ms, commencing at the start of the subperiod. Thus, if these impulses are envisaged in a given subperiod, the first occurs at the zero time of this subperiod, the second after 125 ms and the third after 250 ms (=2·TU). Then, there is no more inhibition in this subperiod, namely for slightly less than 750 ms.

As it is not known at which time in an inhibition cycle that the first time interval $TI_1$ of the measurement method is started, it is advantageously envisaged that the total measurement duration $T_{Mes}$ encompasses as close to entirely as possible an inhibition cycle to be sure that all the inhibitions envisaged for an inhibition cycle have occurred during the plurality of measured time intervals $TI_n$. However, as the time intervals are determined by the braking impulses which are particularly dependent on the variable rotational speed of the generator, it is practically not possible to obtain a total measurement duration $T_{Mes}$ exactly equal to an inhibition cycle. Consequently, in a preferred alternative embodiment, it is envisaged to end the measurements of the time intervals at the first braking impulse according to a time period corresponding to an inhibition cycle. Thus, $T_{Mes}=C_{Inh}+T_{add}$. It will be noted that the probability of an inhibition impulse being counted in excess is high, or even more than one inhibition if the additional duration $T_{add}$ were to exceed TU=125 ms. To prevent this, in a preferred alternative embodiment, it is envisaged that the time intervals $TI_n$ are less than TU/2. In the alternative embodiment in question, this means that at least one braking impulse is needed for each electrical period of the voltage signal $U_1$. Furthermore, it is envisaged to start the first time interval $TI_1$ at the end of the braking impulse directly following the detection of an inhibition. Thus, it is ensured that an inhibition is not counted in excess relative to the total number of inhibitions envisaged in an inhibition cycle. In the preferred alternative embodiment disclosed herein, it is therefore envisaged to perform time interval measurements between braking impulses and make the calculations described in relation to the table in FIG. 7 before starting the measurement method for the plurality of time intervals $TI_n$ determining the total measurement duration $T_{Mes}$.

Figure 5B:
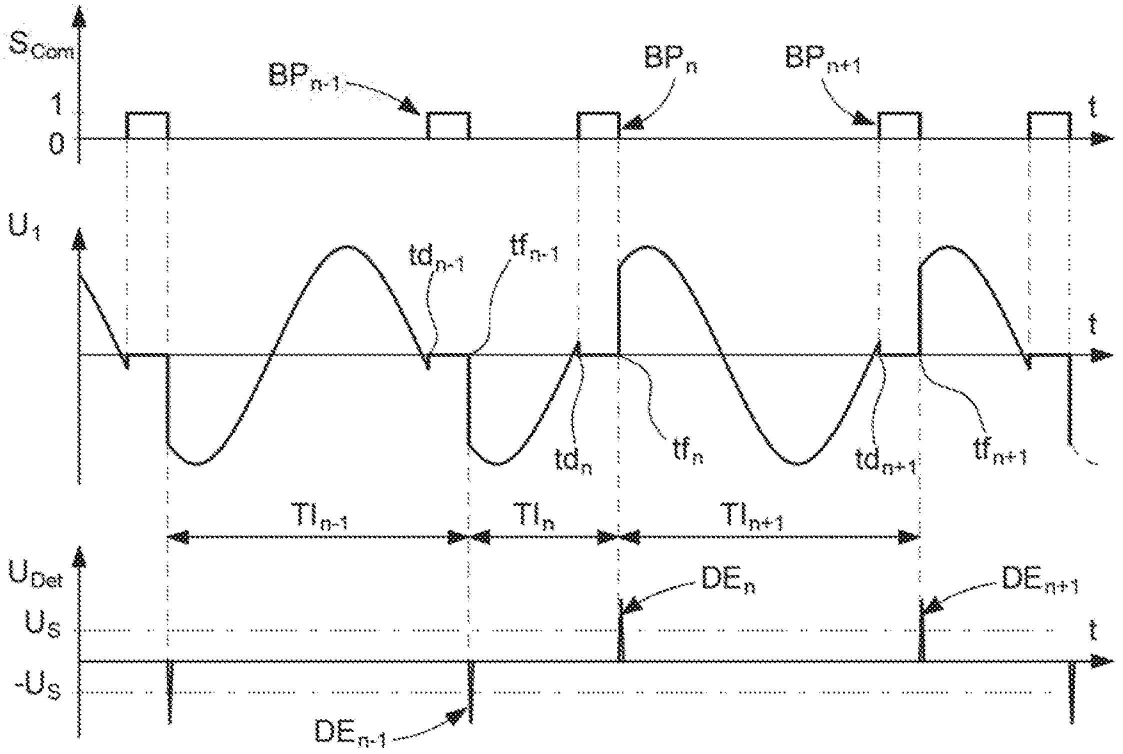

In FIG. 5B, the control signal $S_{Com}$, the voltage signal $U_1$ and the voltage signal $U_{Det}$ detected by the measurement device in an embodiment of the measurement method according to the invention are represented, for a second regulation mode of the medium rotational speed of the electromechanical transducer wherein the regulation device is arranged to generate regulation impulses $BP_n$ such that any two successive regulation impulses have at the respective starts $td_n$ thereof approximately a positive whole number of alternations of an induced voltage signal generated by the variable magnetic flux in the stator, formed by at least one coil, when the rotor of the electromechanical transducer is rotating. In the second regulation mode, the regulation impulses have, at least over a certain regulation period, substantially the same duration and the regulation of the medium rotational speed of the rotor during this regulation period is obtained by a variation of the positive whole number of alternations mentioned above between the regulation impulses. Otherwise, the measurement method remains similar to that described for the first regulation mode and the three conditions described above also apply. In the case of a timepiece equipped with a generator, it is understood that it is preferable to carry out the measurement method when the barrel driving this generator is assembled, such that the force couple is relatively high and it is then necessary to perform sufficient braking impulses to regulate the rotational speed of the generator.

Finally, any teaching provided in the present description of the invention in relation to a timepiece equipped with a generator also applies, by analogy, to a timepiece equipped with a continuous rotation motor and an electrical power supply to power this motor with motor electrical impulses. In such an embodiment, the electromechanical transducer is thus a continuous rotation motor forming the motor device of the horological movement. This motor is formed by a rotor equipped with permanent magnets and a stator comprising at least one coil through which a variable magnetic flux, which is generated by the magnets of the rotor when the latter is rotating, passes. In this case, the regulation impulses are motor impulses which are each generated by a momentary electrical power supply of said at least one stator coil. To do this, the switch 52 of the regulation circuit is then arranged between an electrical terminal of the stator and a terminal of the electrical power supply suitable for delivering a certain power supply current to the coil.

The invention claimed is:

1. A method for controlling a timepiece (2) based on a medium frequency of a digital signal (SDP, SDI) which is derived from a reference periodic signal (SPR) generated by an oscillator (26) forming an electronic time base (25) of the timepiece (2), this timepiece comprising a movement (4) incorporating a mechanism formed by a kinematic chain (8) which is arranged between a motor device (6; 10) of the movement and an analogue time display device (12), the motor device being formed by or the kinematic chain comprising or the kinetic chain being kinematically linked to a continuous rotation electromechanical transducer (6) of which the medium rotational speed is regulated by a regulation device (50), associated with the electronic time base, according to a nominal rotational speed, this regulation device being arranged to successively supply to the electromechanical transducer regulation impulses (BPn) to regulate the medium rotational speed thereof, these regulation impulses defining respectively the same events (tf n) which are synchronised on the rising edges or on the falling edges of said digital signal and which are detectable, by a measurement device (70) without galvanic contact with the movement, at respective detection times having the same time phase-shift with said same events;

the method comprising the following steps:

A) successively supplying to the electromechanical transducer the regulation impulses (BPn) to regulate the medium rotational speed thereof, these regulation impulses defining respectively the same events (tf n) which are synchronised on the rising edges or on the falling edges of said digital signal;

B) measurement, without galvanic contact with the movement, of a plurality of successive time intervals ($TI_n$)

each occurring between two detection times which are detected for two respective regulation impulses among said regulation impulses;

C) determination, for each time interval of the plurality of time intervals, of a corresponding whole number ($M_n(S_{DP})$, $M_n(S_{DI})$) which is equal to the rounded result ($NR_n(S_{DP})$, $NR_n(S_{DI})$), to the nearest integer, of the division of this time interval by the theoretical medium period ($PT_{DP}$, $PMT_{DI}$) given by said digital signal;

D) summation of the whole numbers determined in step C) for the plurality of time intervals, to thus obtain a total number of periods of said digital signal;

E) summation of the measured time intervals of the plurality of time intervals, to thus obtain a total measurement duration ($T_{Mes}$) corresponding to said total number of periods; and F) calculation of the medium frequency of said digital signal by dividing the total number of periods by said total measurement duration; and G) controlling the timepiece to operate by correcting a number of inhibitions applied to the digital signal based determining that the calculated medium frequency is deviated from a predetermined value.

2. The method according to claim 1, wherein the measurement of the plurality of successive time intervals in step B) is performed such that each is less than a maximum duration which is equal to the theoretical medium period for said digital signal divided by double the maximum relative error for the natural frequency (FNR) of the reference periodic signal relative to a theoretical reference frequency (FRT).

3. The method according to claim 1, wherein said digital signal is a periodic digital signal (SDP) wherein the medium frequency is equal to the medium natural frequency, over said total measurement duration, of the reference periodic signal divided by a given whole number.

4. The method according to claim 3, wherein the precision of said oscillator is determined by calculating a relative error given by the result of the division of the difference between said medium frequency of the periodic digital signal obtained in step F) and a theoretical medium frequency, equal to the reciprocal of said theoretical medium period ($PT_{DP}$), by this theoretical medium frequency.

5. The method according to claim 1, wherein said digital signal is an inhibited digital signal (SDI) which has periods (PDI, PDI*) of variable durations according to an inhibition of a certain number of periods of the reference periodic signal during successive inhibition cycles.

6. The method according to claim 5, wherein the precision of the analogue time display device is determined by calculating a relative error given by the result of the division of the difference between the medium frequency of the inhibited digital signal, obtained in step F), and a theoretical medium frequency, equal to the reciprocal of said theoretical medium period (PMTDI), by this theoretical medium frequency.

7. The method according to claim 6, wherein the rate of the timepiece is obtained by multiplying said relative error by the number of seconds in one day.

8. The method according to claim 5, wherein said inhibition is performed according to a process which distributes the inhibition of the certain number of periods of the reference periodic signal using each inhibition cycle; and in that the plurality of successive time intervals is envisaged such that the increase of the duration of any time interval among this plurality, resulting from the inhibition of one or more period(s) of the reference periodic signal during this time interval, is at most equal to half of one/said theoretical medium period of the inhibited digital signal.

9. The method according to claim 1, wherein said electromechanical transducer is a generator (6) formed by a rotor (18) equipped with permanent magnets and a stator (16) comprising at least one coil (22A,22B,22C) through which a variable magnetic flux, which is generated by the magnets of the rotor when the latter is rotating, passes; and in that said regulation impulses are braking impulses of the rotor each generated by a momentary short-circuit of said at least one coil.

10. The method according to claim 1, wherein said electromechanical transducer is a continuous rotation motor formed by a rotor equipped with permanent magnets and a stator comprising at least one coil through which a variable magnetic flux, which is generated by the magnets of the rotor when the latter is rotating, passes, the continuous rotation motor forming said motor device; and in that said regulation impulses are motor electrical impulses which are each generated by a momentary electrical power supply of said at least one coil.

11. The method according to claim 9, wherein said regulation device is arranged to generate regulation impulses in such a way that, in normal operation, any two successive regulation impulses have between the respective starts ($td_n$) thereof the same positive whole number of alternations of an induced voltage signal generated by said variable magnetic flux in said at least one coil when the rotor is rotating; and in that the regulation of the medium rotational speed of the rotor is obtained by a variation of the duration of the regulation impulses.

12. The method according to claim 9, wherein said regulation device is arranged to generate regulation impulses in such a way that, in normal operation, any two successive regulation impulses have between the respective starts ($td_n$) thereof the same positive whole number of alternations of an induced voltage signal generated by said variable magnetic flux in said at least one coil when the rotor is rotating; in that the regulation impulses have, at least over a certain regulation period, substantially the same duration; and in that the regulation of the medium rotational speed of the rotor during said regulation period is obtained by a variation of said positive whole number.

* * * * *